July 13, 1965  F. RIEMENSCHNEIDER ETAL  3,194,049
TOP-PRESSURE FORGING HAMMER
Filed Oct. 19, 1961   8 Sheets-Sheet 1

Fig.1

INVENTORS
F. Riemenschneider + H. Hassel
BY
Lowry & Rinehart
ATTYS.

INVENTORS
F. RIEMENSCHNEIDER
BY  & H. HASSEL
Lowry & Rinehart
ATTYS.

July 13, 1965   F. RIEMENSCHNEIDER ETAL   3,194,049
TOP-PRESSURE FORGING HAMMER
Filed Oct. 19, 1961   8 Sheets-Sheet 8

Fig. 8

INVENTORS
F. RIEMENSCHNEIDER
& H. HASSEL
BY
Lowry & Rinehart
ATTYS.

United States Patent Office 3,194,049
Patented July 13, 1965

3,194,049
TOP-PRESSURE FORGING HAMMER
Fritz Riemenschneider, Leverkusen, and Harald Hassel, Opladen, Germany, assignors to Eumuco Aktiengesellschaft für Maschinenbau, Leverkusen, Germany
Filed Oct. 19, 1961, Ser. No. 146,208
6 Claims. (Cl. 72—453)

This invention is concerned with a top-pressure forging hammer for hammer forging and die forging.

The top-pressure forging hammer is known to have the advantage, as compared with the drop hammer, that the same impact work can be stored in the hammer ram over a shorter distance, so that the overall height of the hammer can be reduced and at the same time the number of blows and thus the working capacity of the hammer can be increased. Top-pressure forging hammers are usually operated with steam or compressed air. The pressure medium is admitted to both sides of the piston connected to the ram.

It has already been proposed for die forging hammers which operate on the drop hammer principle to be operated with the use of a liquid under pressure, e.g. oil.

The invention relates to a top-pressure forging hammer which is driven hydraulically. It is characterized in that the drive is effected by means of a liquid pump having a constant delivery quantity. Interposed between the pump and the cylinder chambers of the piston connected to the ram is an oscillatable liquid system which is formed by a pressure liquid which is kept continuously under an initial load. At the same time, the oscillatable system consisting of the ram and the elastic volume of pressure liquid is coupled by way of the lower annular piston face for the upward movement and by way of the difference between the two piston faces for the downward movement. The chamber containing the volume of liquid is advantageously connected to the cylinder chamber situated above the piston and this cylinder chamber is connected to the oil container. Each pipe includes shut-off members which are adapted to be controlled in opposite directions to one another in dependence on the movement of the ram.

The difference between the stream of liquid produced by the pump at a constant speed and the non-uniform speed of the liquid in the operating cylinder is compensated for by a volume displacement of the elastic intermediate element with an appropriate pressure fluctuation. The volume of pressure liquid and the piston faces, and also the pressure fluctuations of the liquid, are so adjusted to one another that the period of natural oscillation of the oscillatable system consisting of the ram and the storage mass of the pressure liquid is in the region of twice the time taken by the downward movement of the ram. For the upward movement, the lower piston face is so dimensioned for lifting the ram that the period of natural oscillation of the system is in the region of twice the time of the upward movement of the ram. The change-over of the hammer movement is effected by control elements which are controlled in known manner in dependence on the movement of the ram, and actuation can be effected, e.g. electro-hydraulically or electro-pnuematically. A non-return valve is provided for equalizing the pressure between the upper and lower sides of the piston.

A pressure controller is in communication with the volume of pressure liquid. A blow can only be initiated when a pressure set at this controller is reached. Owing to the different kinds of blows, with the usual sizes of stroke length for forging hammers, the different die, forging heights and the different return travels have only a very small effect. The differences are slight and are in practice not noticeable.

But in the case of short-stroke hammers, if the usual height differences of the dies and forgings are retained, the percentage proportion of these differences may increase in relation to the total stroke, further augmented by the amount of the rebound. This may have the effect of making the differences in impact intensity quite marked.

According to a further feature of the invention, in order to avoid this disadvantage, a freely movable and limitedly displaceable piston is provided in the chamber above the ram piston with a throttling aperture. With this arrangement, the through passage to the pipe leading to the control member is adapted to be closed by this piston in the end position remote from the piston connected to the ram. In this way, the result is achieved that the ram can be brought to a standstill at the desired length of stroke by means of the freely movable piston. Thus the total stroke of the ram remains almost the same despite different die and forging heights and different return travel speeds, due to different impact rebound influences.

Two examples of embodiment of the subject of the invention are illustrated in the drawings.

Figure 1:
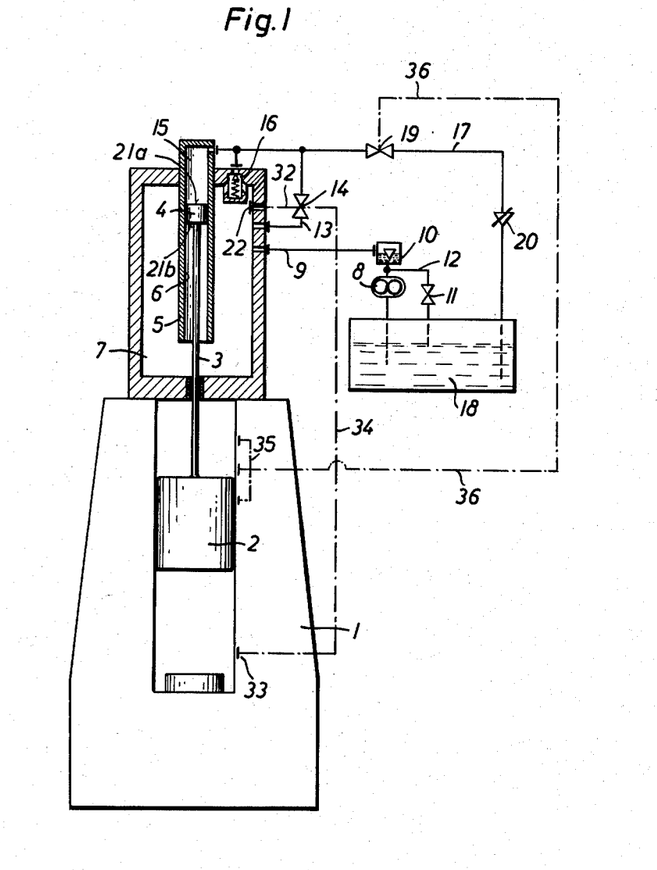
FIG. 1 shows diagrammatically a top-pressure forging hammer for relatively long strokes according to the invention, partly in section.

The top-pressure forging hammer according to FIG. 1 comprises a ram 2 which moves upwards and downwards in a hammer frame and is connected by way of a piston rod 3 to the piston 4 which slides in a cylinder 5. A chamber 6 below the piston 4 is in open communication with a chamber 7 which accommodates the storage mass of pressure liquid and contains a considerable volume of liquid. A pump 8 with constant delivery quantity has a delivery pipe 9 leading by way of a non-return valve 10 to the liquid chamber 7. The pump 8 is connected in known manner to a by-pass pipe 12 which can be controlled by a valve 11. From the liquid chamber 7, a direct pipe 13 leads by way of a shut-off element 14 to a cylinder chamber 15 above the piston 4. The liquid chamber 7 is also connected with the cylinder chamber 15 by way of a non-return valve 16. The cylinder chamber 15 can also be made to communicate through the pipe 17 with a supply container 18, and a shut-off element 19 is arranged in this pipe.

The chamber 7 with the volume of liquid serves as an elastic intermediate element between the pump 8 and the piston 4 both during the impact travel and during the return travel of the piston. It is completely filled with pressure liquid and is so dimensioned that the pressure oscillation occurring during operation has the form suitable for the operation of the forging hammer. The pump 8 delivers into the liquid volume of the chamber 7.

The arrangement according to the invention operates in the following manner:

The pump 8 delivers uninterruptedly with a constant delivery quantity into the liquid volume in the chamber 7, both during the upward movement and during the downward movement of the ram. It is only switched to pressureless circulation through the circuit including the pipe 12 and the valve 11 if the ram 2 is to remain stationary. If the ram is in its upper position, the pressure in the liquid chamber 7 increases until a pressure controller 22 responds, which opens the shut-off element 14 by way of a line 32. As a result, the liquid volume and the chamber 15 are subjected to the same pressure. Since the upper face of the piston 4 is larger than the lower face, which is reduced by the amount of the piston rod cross-section, the ram is driven downwards by the pressure and by its own weight. The pressure in the liquid volume 7 increases until the ram has reached the speed corresponding to the pump delivery quantity, and then decreases again. The pressure in the liquid volume at the end of the stroke depends on the dimensioning of the chamber 7; this is preferably so chosen that the pressure at the end of the stroke exceeds the amount necessary for lifting the ram. Shortly before impact, the ram operates a preferably electric tripping device 33, 34 for the shut-off element 14, which device closes this shut-off element, preventing communication between liquid volume 7 and chamber 15, whereupon the shut-off element 19 is opened, placing the chamber 15 in communication with the supply container 18. As a result, the chamber 15 becomes pressureless and the ram ascends. The pressure in the liquid volume 7 increases until the ram has reached the speed corresponding to the delivery quantity of the pump, and then the pressure decreases again. Since the pump delivery quantity and the liquid volume 7 have already been calculated for the most advantageous downward travel, the most advantageous pressure curve for the upward travel is achieved by appropriate dimensioning of the lower face 21b of the piston 4. Depending on the desired length of fall, at the set height the ascending ram operates preferably an electric tripping device 35, 36 for the shut-off element 19 and as a result this shut-off element is closed, blocking communication between chamber 15 and the supply chamber 18. By its own weight and the counter-pressure developed in the chamber 15 after the shut-off element 19 is closed, the ram 2 is brought to a standstill; unallowable pressure increase in the chamber 15 is prevented by the non-return valve 16. The ram then remains stationary until the pressure in the liquid volume 7 set at the pressure controller 22 is reached and the cycle commences again.

The pressure liquid volume in the chamber 7 is the elastic element of the oscillatory system and participates fully in this capacity in the oscillation. The oscillatory system consisting of a ram mass, the volume of pressure liquid and the piston faces has a period of natural oscillation of $$T = \frac{2\pi}{f} \times \sqrt{\frac{v \times m}{e}}$$

In this formula $f$ = the piston faces 21a and 21b of the piston 4,
$v$ = the volume of pressure liquid,
$m$ = the mass of the ram,
$E$ = the modulus of elasticity of the pressure liquid.

If the object of the volume of pressure liquid, namely, compensation between constant pump delivery and non-uniform ram movement, is to be achieved, the time of the upward or downward travel must be of the order of magnitude $T/2$ and must in any case be less than T. Therefore, there is the following relationship for the time $t$ of the upward or downward stroke.

$$t < T \text{ or } t < \frac{2\pi}{f}\sqrt{\frac{v \times m}{e}}$$

by substitution, the result is obtained that $$t \times f \sqrt{\frac{E}{v \times m}}$$

must be less than 2.

Figure 2:
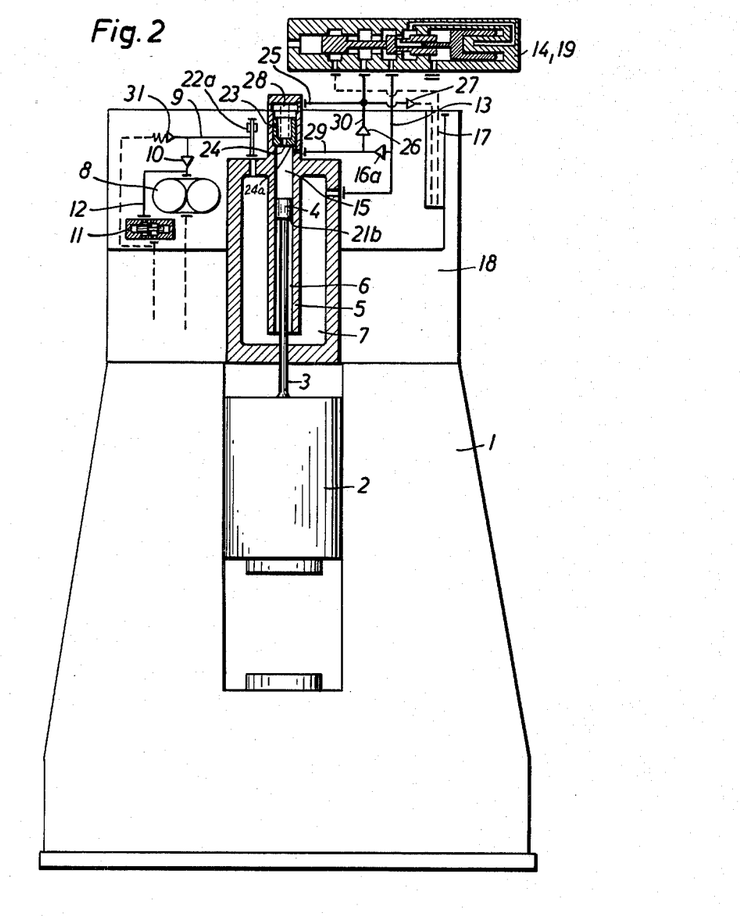
FIG. 2 is a longitudinal sectional view through a top-pressure forging hammer for relatively short strokes.
Figure 2A:
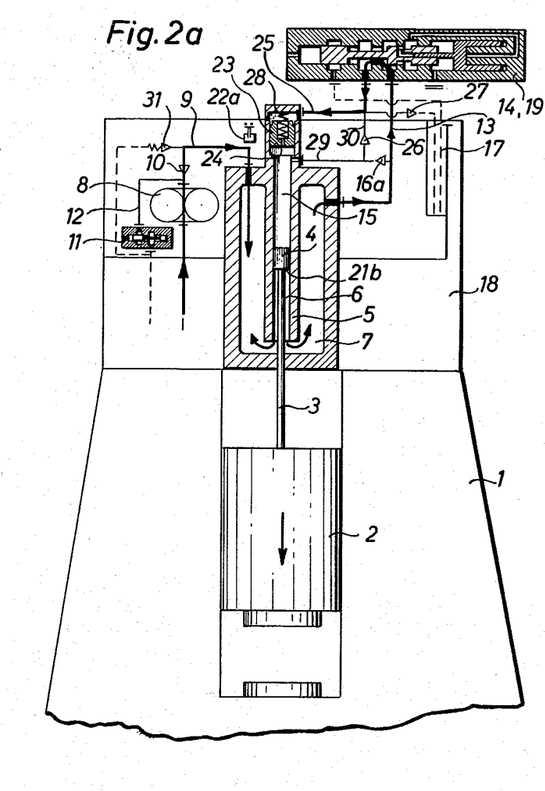

In the example of embodiment of a short-stroke forging hammer shown in FIG. 2, the parts 1 to 19 correspond to the parts of the forging hammer shown in FIG. 1. The control elements 14 and 19 are, however, combined in a single unit to which the pipe 13 leads from the liquid chamber 7. From this pipe a pipe 29 with a non-return valve 16a branches off and leads to the cylinder chamber 15 above the piston 4. Also provided is a pipe 30 which connects the pipe 29 to the control elements 14, 19 and comprises a non-return valve 26. The pipe 9 leading from the liquid pump is also provided with a safety valve 31 and a pressure controller 22a.

In the upper cylinder chamber 15 there is situated a freely movable piston 23 which comprises a throttling aperture 24. The travel of the piston 23 is limited by abutments. When it bears against the upper abutment 28, it blocks the outflow of the pressure liquid through the pipe 25. The pipe 17 by way of a non-return valve 27, which serves as a replenishment suction valve, establishes communication with the supply container 18.

Valve 14, 19 is controlled electropneumatically in any desired conventional manner. The valve is switched on by means of a pressure controller 22a which functions in the same manner as previously described pressure controller 22. The valve may be switched off electrically as shown in FIG. 1, or by means of an electrohydraulic mechanism as shown in FIG. 2. This mechanism is not described, since it is conventional and forms no part of the instant invention.

Figure 1A:
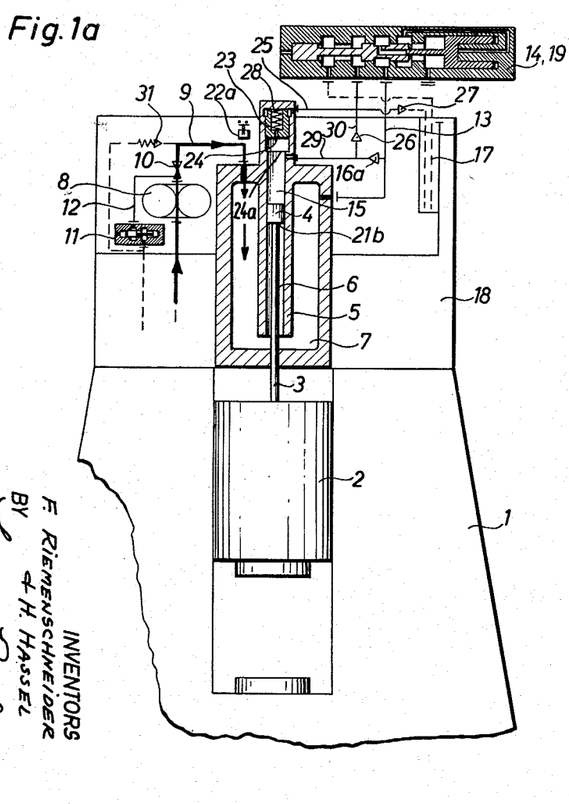
FIGS. 1a, 2a, 3, 4, 5a, 5b, 6a, 6b, 7a and 7b are all views showing the apparatus of FIG. 2 in different positions of adjustment.

While the ram is descending, a tripping device (not shown), similar to the tripping device 35, 36 illustrated in FIG. 1, displaces the valve of the control element 14, 19 from the valve position illustrated in FIG. 1a. As the ram ascends, fluid may escape from above the movable piston 23 to the supply container 18 via pipes 25 and 30, control element 14, 19 and pipe 17. After the ram ascends and a predetermined pressure develops at the pressure controller 22a, the valve of the control element is moved by the pressure controller 22a from the vent position illustrated in FIG. 1a to the position illustrated in FIG. 2.

Figure 3:
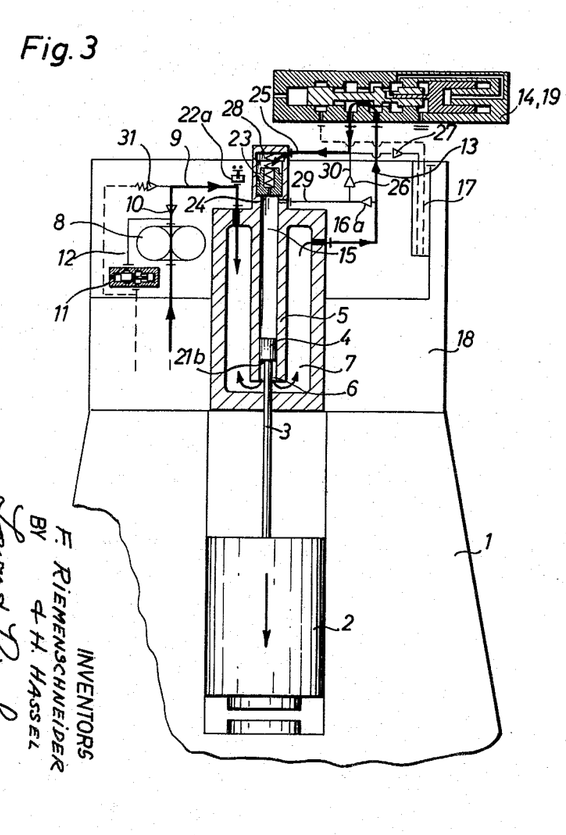

When, by operation of the control element 14, 19, a blow is initiated, the pressure liquid flows out of the container 7 through the pipe 13, the control elements 14, 19 and the pipe 25 against the piston 23 which is in its upper end position. The piston 23 presses on the pressure liquid in the chamber 15 and thereby drives the piston 4 downward. In order to keep its travel short and its speed low, the cross-section of the piston 23 is several times larger than that of the piston 4. Its swept volume on the contrary is smaller, so that the piston bears against the lower abutment surface 24a before the piston 4 has reached its lower end position. In order that the piston 4 can still be further accelerated, a spring-loaded non-return valve 26 then opens and the chamber 15 receives pressure through a pipe 29 as seen in FIG. 3.

Shortly before the ram impinges on the forging, the control element 14, 19 is changed over to a vent position as discussed hereinbefore.

Figure 4:
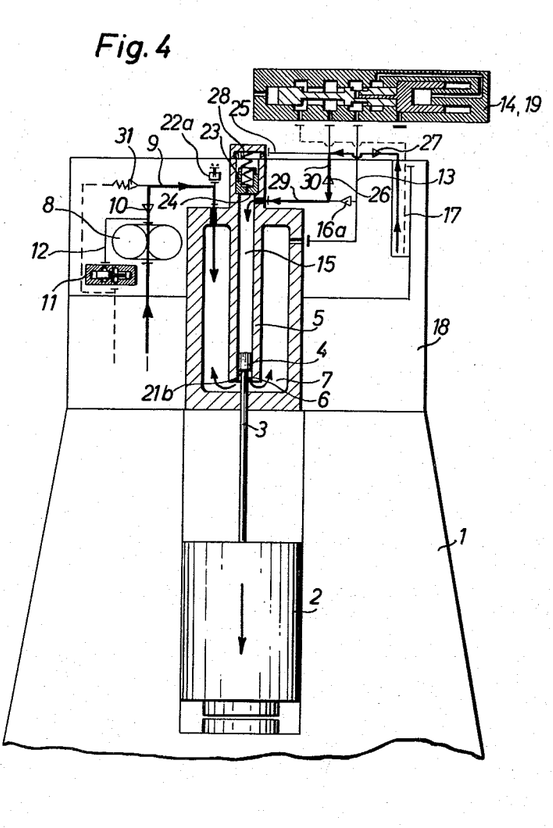
Figure 5A:
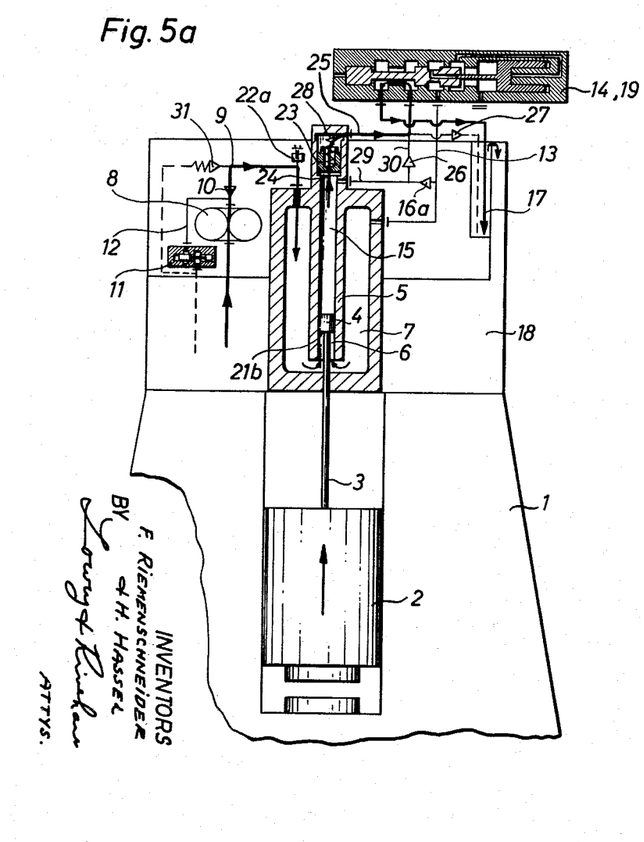
Figure 5B:
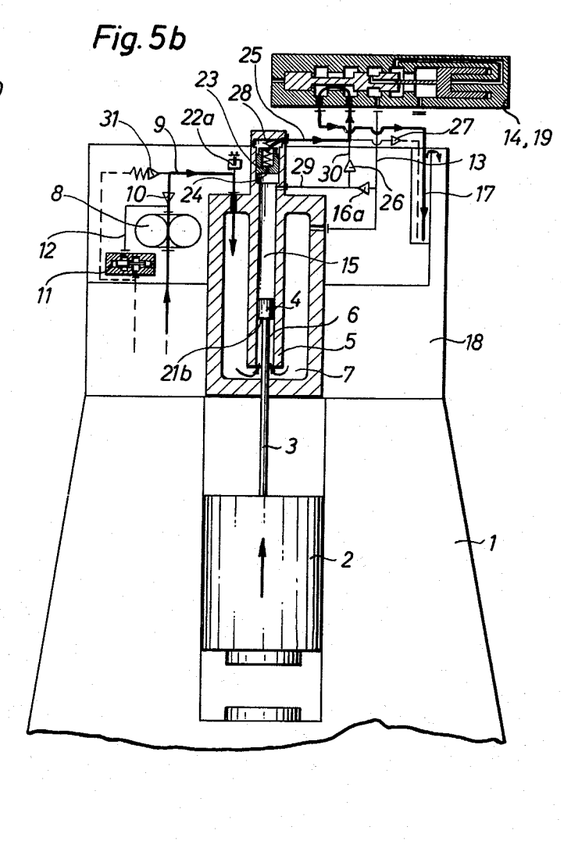

The pressure liquid still lacking in the chamber 15 through the further travel of the piston 4 is then inspired through the replenishment suction valve 27 as seen in FIG. 4. Then, when after the impingement of the ram the latter is returned both by the pressure below the piston face 21 and also by the rebound energy, the pressure liquid situated in the chamber 15 presses the piston 23 upwards, and this piston presses the pressure liquid situated above it back into the supply container 18 through the pipe 25, the control element 14, 19 and the pipe 17. A proportion of the pressure liquid flows out of the chamber 15 through the throttling aperture 24 directly through the pipe 25, control elements 14, 19 and pipe 17 into the supply container 18. FIGS. 5a and 5b show this position after a soft impact and a strong rebound impact, respectively. When the piston 23 has terminated its upward movement, it bears against the surface 28 to close the passage towards the pipe 25, so that the braking travel for the piston 4 follows, during which the pressure liquid situated in the chamber 15 is forced back into the container 7 through the non-return valve 16a which corresponds in functions and structure to previously mentioned valve 16.

The length of the stroke up to the commencement of braking depends on the quantity of liquid which can flow out of the chamber 15. It is composed of the swept volume of the piston 23 and the quantity of liquid which can escape from the throttling aperture in the piston 23 before the vent pipe 25 is blocked by the piston. The latter, i.e., the volume of fluid passing through the throttle aperture, depends on the duration or speed of the rebound stroke. It is considerably smaller after an impact causing a strong rebound than after a soft impact, and therefore the ram travel before braking starts is also smaller after a strong-rebound impact. Since, on the other hand, owing to the greater end speed, or rebound speed, the braking distance is greater after a strong-rebound impact, an approximately identical total stroke can be achieved in both cases. With a soft impact the stroke is considerable and the braking distance small, with a strong-rebound impact the stroke is small and the braking distance considerable.

Figure 6A:
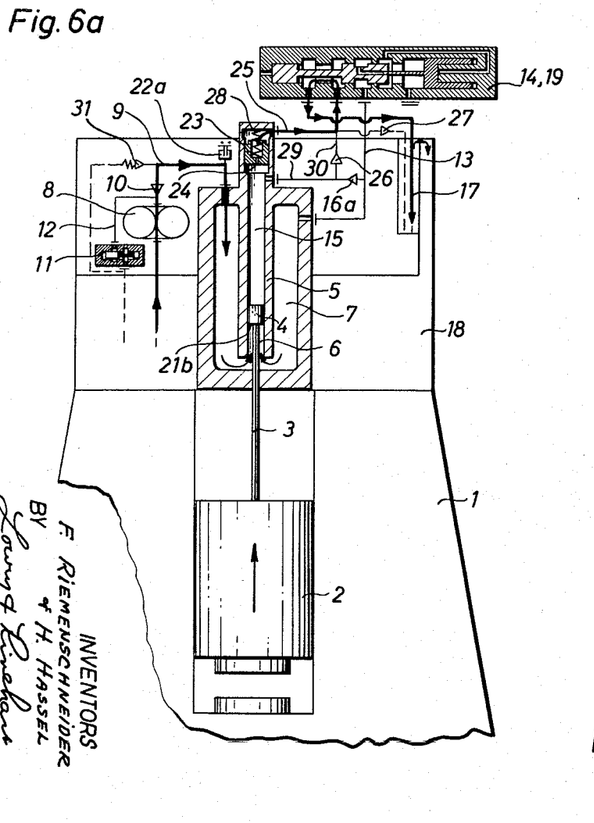
Figure 6B:
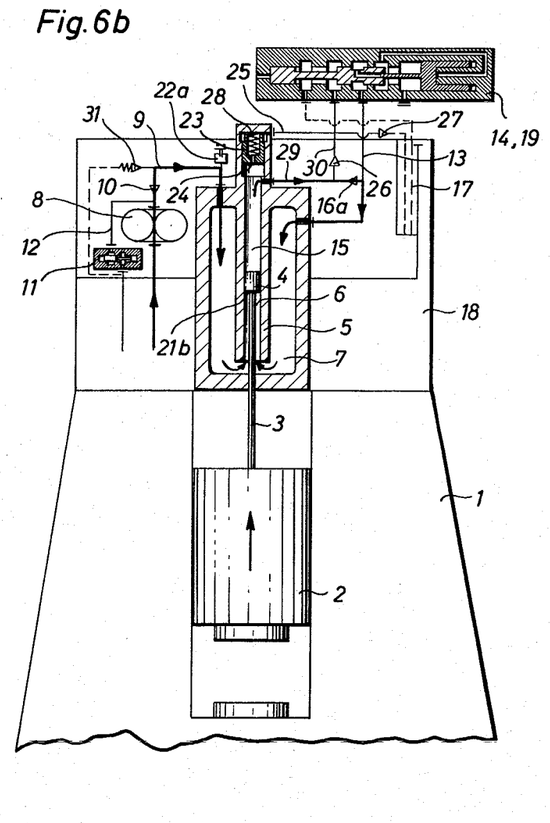
Figure 7A:
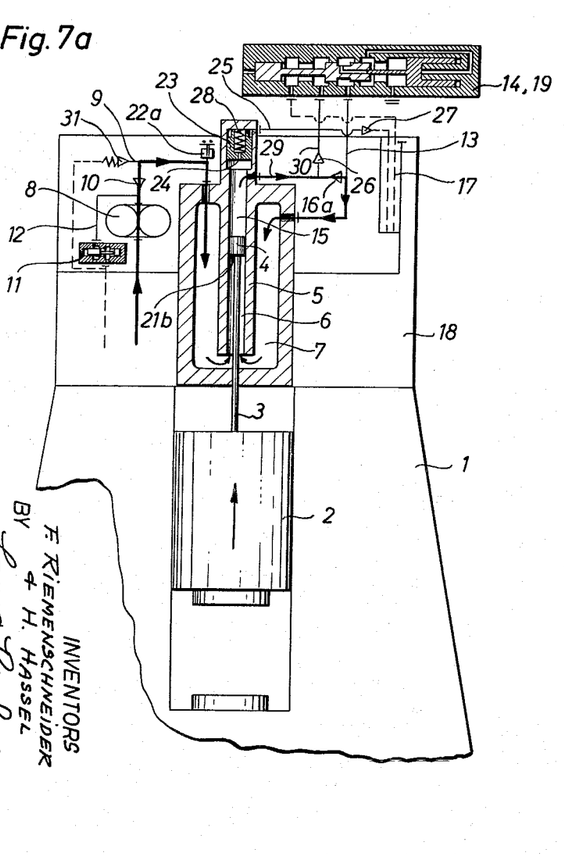
Figure 7B:
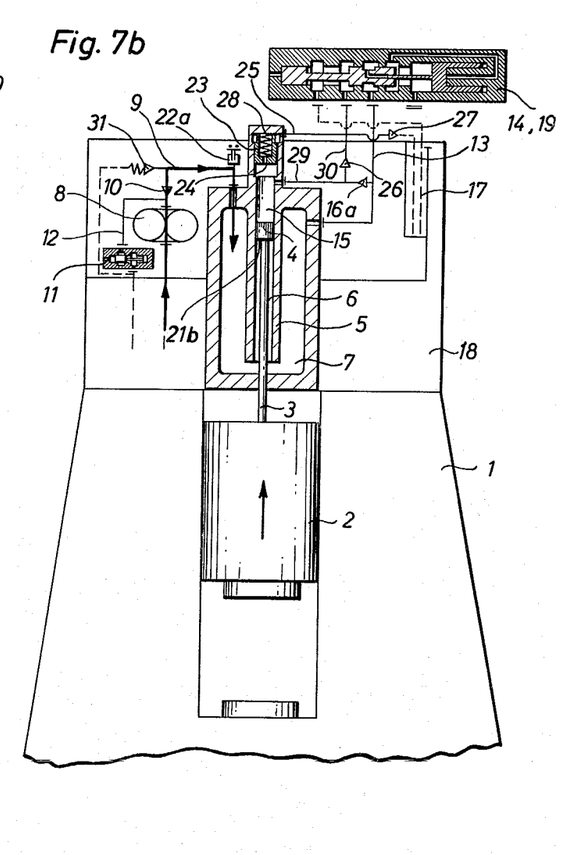
Figure 8:
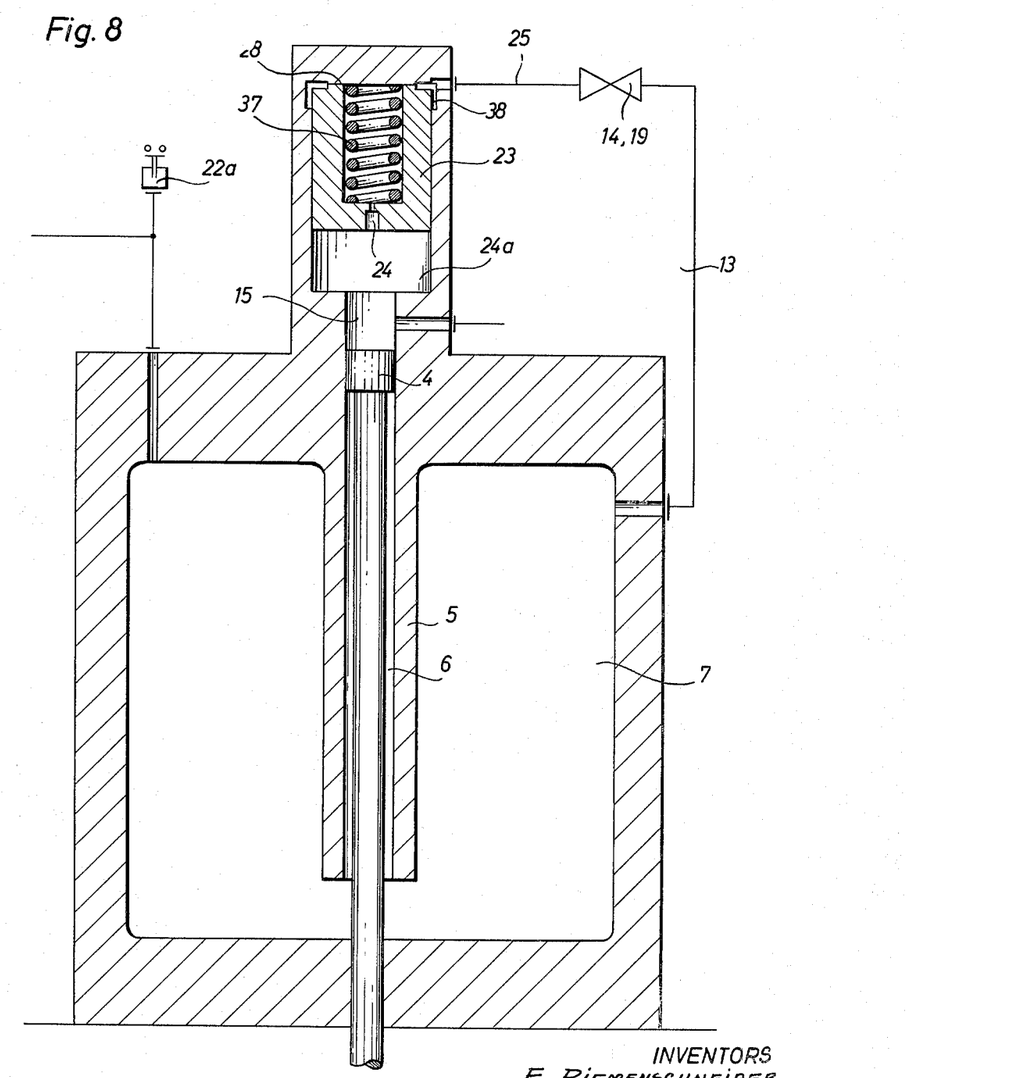
FIG. 8 is an enlarged diagrammatic view disclosing, on an enlarged scale, the interrelation of certain components of FIG. 2.

An understanding of the above operation can best be conveyed by comparing the positions of the piston 23 after a soft impact, as illustrated in FIGS. 5a, 6a and 7a, with the corresponding piston positions for a strong-rebound impact, which are depicted by FIGS. 5b, 6b and 7b. After a soft impact, the ram rebound speed is naturally slower than the strong-rebound impact. The soft impact, therefore, allows the fluid in chamber 15 to be discharged therefrom through the throttling aperture 24, without causing the piston 23 to move upwardly and block communication with the pipe 29. In this regard, note the positions of piston 23 in FIGS. 5a, 6a and 7a. The high rebound speed of the strong-rebound impact, on the other hand, effects a rapid upward movement of the piston 23, which blocks communication between chamber 15 and the vent pipe 25 and causes all the fluid within chamber 15 to be discharged through pipe 29, check valve 16 and pipe 13. Since all the fluid within chamber 15 is forced back to the container 7 against a high pressure, considerable braking is effected. It will be readily noted by observing the piston positions in FIGS. 5b, 6b and 7b that communication with the vent pipe 29 is blocked almost immediately after a strong-rebound impact. In consequence, braking of the ram is effected during most of the rebound stroke. During soft impact rebound, the valve 23 does not prevent communication between chamber 15 and vent pipe 29 until the rebound stroke is substantially completed, as shown in FIGURE 7a. To effect a bias on the control piston 23 a spring 37 is positioned between the hammer frame and a cylindrical recess formed by the control piston. To facilitate entry of the fluid above the control piston 23, the upper surface of the control piston 23 and the adjacent surface of the hammer frame are recessed to provide an annular space, as shown at 38.

The throttling aperture 24 is expediently so designed that the sum of the travel and the braking distance is approximately identical in both cases. Since the magnitude of the stroke depends only on the swept volume of the piston 23 and on the size of the throttling aperture 24, a variation in the die heights has no influence on the length of stroke for a given location of the die.

Although preferred embodiments of the invention have been disclosed, it is to be understood that minor modifications may be made within the spirit and scope of the invention, as defined in the appended claims.

We claim:

1. A top pressure forging hammer comprising a vertically reciprocating ram having a downwardly forging stroke, a cylinder disposed above said ram, a piston in said cylinder, a piston rod connecting said ram to said piston with said piston having a larger upper face surface than a lower face surface thereof, a hydraulic drive system connected to said cylinder, said hydraulic drive system including a constant delivery pump permanently connected to said cylinder for providing fluid acting on said piston lower face, to maintain a constant upward force on said ram, an oscillatory hydraulic system including a relatively large container completely filled with liquid and in open communication with said cylinder interposed in said hydraulic drive system and receiving hydraulic fluid from said hydraulic drive system, said liquid under pressure acting as a hydraulic spring, valve means for controlling flow of hydraulic fluid from said container to said cylinder for reaction on said upper piston face, and a freely movable control piston mounted in said cylinder above said first mentioned piston for controlling the flow of fluid therethrough as the ram is forced upwardly by the fluid pressure within the container, said oscillatory hydraulic system being connected to said cylinder above said control piston and said control piston having a throttling aperture therethrough, said liquid under pressure acting on the lower surface of said piston in said cylinder for upward movement and on the difference of both piston surfaces for downward movement.

2. The top pressure forging hammer of claim 1 wherein said hydraulic drive system includes a main fluid line leading from said container in communication with the under side of said first mentioned piston to said valve means, a fluid line leading from said main fluid line to said cylinder above said piston and having a one-way valve therein for only admitting hydraulic fluid to said cylinder.

3. The top pressure forging hammer of claim 2 wherein said hydraulic drive system includes a fluid line between said pump and said cylinder in communication with the under side of said first mentioned piston with this fluid line having a non-return valve therein.

4. The top pressure forging hammer of claim 1 wherein said cylinder is supported by a housing defining a fluid chamber, and said cylinder depending into said chamber and having the lower end thereof opening into said chamber for receiving hydraulic fluid therefrom.

5. The top pressure forging hammer according to claim 1 wherein the oscillatory hydraulic system has an oscillation frequency of approximately twice the time of the upward and downward movement of the ram.

6. The structure of claim 1 wherein the large container is connected with the cylinder above the piston and the cylinder above the piston is connected with a fluid reservoir wherein the flow of fluid through each of said connections is changed depending on the movement of the piston, and wherein a connection is provided between the large container and the portion of the cylinder above the piston, said last mentioned connection having a non-return check valve therein.

References Cited by the Examiner

UNITED STATES PATENTS

| | | | |
|---|---|---|---|
| 962,705 | 6/10 | Fielding | 78—42 |
| 1,808,431 | 6/31 | Osborne | 78—42 |
| 2,619,072 | 11/52 | Clarke | 78—42 |
| 2,770,222 | 11/56 | Anderson | 121—38 |

FOREIGN PATENTS 729,941   5/55   Great Britain.

WILLIAM J. STEPHENSON, *Primary Examiner.*

RICHARD H. EANES, *Examiner.*